United States Patent
Kim

(10) Patent No.: US 11,437,024 B2
(45) Date of Patent: Sep. 6, 2022

(54) INFORMATION PROCESSING METHOD AND APPARATUS THEREFOR

(71) Applicant: LG ELECTRONICS INC., Seoul (KR)

(72) Inventor: Sookyoung Kim, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 261 days.

(21) Appl. No.: 16/807,084

(22) Filed: Mar. 2, 2020

(65) Prior Publication Data

US 2021/0193128 A1    Jun. 24, 2021

(30) Foreign Application Priority Data

Dec. 19, 2019  (KR) .................. 10-2019-0171147

(51) Int. Cl.
*G10L 15/18* (2013.01)
*G10L 15/22* (2006.01)
*G06F 3/16* (2006.01)
*G10L 15/26* (2006.01)

(52) U.S. Cl.
CPC .......... *G10L 15/1822* (2013.01); *G06F 3/167* (2013.01); *G10L 15/1815* (2013.01); *G10L 15/22* (2013.01); *G10L 15/26* (2013.01); *G10L 2015/228* (2013.01)

(58) Field of Classification Search
CPC . G10L 15/1822; G10L 15/1815; G10L 15/22; G10L 15/26; G10L 2015/228; G06F 3/167
See application file for complete search history.

(56) References Cited

U.S. PATENT DOCUMENTS

| | | | | |
|---|---|---|---|---|
| 10,101,885 | B1* | 10/2018 | Dand | G06F 3/0304 |
| 10,912,136 | B2* | 2/2021 | Foster | G06F 3/016 |
| 2014/0267008 | A1* | 9/2014 | Jain | G06T 7/73 |
| | | | | 345/156 |
| 2017/0262061 | A1* | 9/2017 | Liu | G06F 3/0304 |
| 2017/0315519 | A1* | 11/2017 | Laurent | G06F 3/011 |
| 2019/0200925 | A1* | 7/2019 | Aimone | A61B 5/6803 |

(Continued)

*Primary Examiner* — Daniel C Washburn
*Assistant Examiner* — Athar N Pasha
(74) *Attorney, Agent, or Firm* — Lee, Hong, Degerman, Kang & Waimey PC

(57) ABSTRACT

Disclosed are an information processing method and apparatus capable of controlling an electronic device in a 5G communication environment by processing information based on execution of a mounted artificial intelligence (AI) algorithm or machine learning algorithm. An information processing method according to the present disclosure may include: obtaining verbal information and non-verbal information related to a controlling subject and a controlled object; generating a first sentence including a coreference and a control command, by converting the verbal information into text; assigning identification information to the controlled object based on analysis of the non-verbal information; generating, from the first sentence, a second sentence supplemented with the coreference by using the identification information on the controlled object; and calling the controlled object by using the identification information on the controlled object included in the second sentence, and distributing the control command to the called controlled object.

16 Claims, 13 Drawing Sheets

(56) References Cited

U.S. PATENT DOCUMENTS

| | | | |
|---|---|---|---|
| 2019/0361575 A1* | 11/2019 | Ni | H04L 67/12 |
| 2020/0058300 A1* | 2/2020 | Kumar | G10L 17/00 |
| 2020/0204673 A1* | 6/2020 | Barathan | G06F 3/0484 |
| 2020/0342018 A1* | 10/2020 | Lange | G06F 16/3344 |
| 2020/0412566 A1* | 12/2020 | Mo | H04W 4/80 |

* cited by examiner

INFORMATION PROCESSING METHOD AND APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0171147, filed on Dec. 19, 2019, the contents of which are all hereby incorporated by reference herein in their entirety.

BACKGROUND

1. Technical Field

The present disclosure relates to an information processing method and apparatus for generating and processing a sentence for controlling a controlled object by using information inputted through various channels, based on executing an artificial intelligence (AI) algorithm or machine learning algorithm in a 5G communication environment.

2. Description of Related Art

In recent years, electronic devices offer various input methods as part of pursuing interaction with a user. For example, the electronic devices may operate a speech input method for receiving speech data spoken by a user, based on executing a specific application program. Furthermore, the electronic devices may recognize the received speech data to derive an intention of a user utterance, and support a speech recognition service for performing a function corresponding to the intention The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

The present disclosure is directed to generating and processing a complete sentence to control a controlled object by using verbal information and non-verbal information obtained through various input channels.

The present disclosure is further directed to, when there is information to be supplemented in a sentence generated using verbal information obtained through one input channel of various input channels, generating and processing a complete sentence supplemented with the information to be supplemented, by using non-verbal information obtained through another input channel of the various input channels.

The present disclosure is still further directed to generating and processing a complete sentence accurately reflecting a user's intention to control a controlled object, by using verbal information and non-verbal information obtained through various input channels.

The present disclosure is still further directed to generating and processing a complete sentence to control a controlled object, without leaking verbal information and non-verbal information obtained through various input channels to a market-dominant natural language processing service enterprise.

The present disclosure is still further directed to increasing speed but decreasing costs in controlling a controlled object, by generating a complete sentence to control the controlled object based on verbal information and non-verbal information obtained through various input channels.

An information processing method according to one embodiment of the present disclosure may include generating a complete sentence by analyzing and supplementing verbal information and non-verbal information obtained through various channels; and controlling a controlled object with a control command included in the complete sentence.

Specifically, the information processing method according to the present embodiment may include: obtaining verbal information and non-verbal information related to a controlling subject and a controlled object; generating a first sentence including a coreference and a control command, by converting the verbal information into text; assigning identification information to the controlled object based on analysis of the non-verbal information; generating, from the first sentence, a second sentence supplemented with the coreference by using the identification information on the controlled object; and calling the controlled object by using the identification information on the controlled object included in the second sentence, and distributing the control command to the called controlled object.

According to the information processing method according to the present embodiment, since the controlling subject's intention to control the controlled object may be accurately reflected by using the verbal and non-verbal information obtained through various input channels, it is possible to improve convenience of the controlling subject in using the controlled object.

An information processing apparatus according to another embodiment of the present disclosure may include: an obtainer configured to obtain verbal information and non-verbal information related to a controlling subject and a controlled object; a first generator configured to generate a first sentence including a coreference and a control command, by converting the verbal information into text; an assigner configured to assign identification information to the controlled object based on analysis of the non-verbal information; a second generator configured to generate, from the first sentence, a second sentence supplemented with the coreference by using the identification information on the controlled object; and a distributor configured to call the controlled object by using the identification information on the controlled object included in the second sentence, and distribute the control command to the called controlled object.

According to the information processing apparatus according to the present embodiment, since a complete sentence generated to control the controlled object may be used as is in a market-dominant cloud-based natural language processing service, it is possible to provide a multi-modal human computer interaction (HCI) environment to control the controlled object, and adapt it to an industrial ecosystem by linking it with post-services such as knowledge retrieval.

In addition to the aforementioned, other methods and systems for implementing the present disclosure, and a computer-readable recording medium having a computer program stored thereon for implementing the methods may be further provided.

Other aspects, features, and advantages will become apparent from the following drawings, claims, and detailed description of the invention.

According to the present disclosure, since the complete sentence generated to control the controlled object may be used as is in the market-dominant cloud-based natural language processing service, it is possible to provide a multimodal human computer interaction (HCI) environment to control the controlled object, and adapt it to an industrial ecosystem by linking it with post-services such as knowledge retrieval.

In addition, according to the present disclosure, since the user's intention may be accurately reflected in the complete sentence generated using the verbal and non-verbal information obtained through the various input channels, it is possible to improve convenience of the user in using the controlled object.

In addition, according to the present disclosure, since the complete sentence to control the controlled object may be generated without leaking the verbal and non-verbal information obtained through the various input channels to the market-dominant natural language processing service enterpriser, it is possible to protect the controlling subject's privacy In addition, according to the present disclosure, since the complete sentence to control the controlled object may be generated based on the verbal and non-verbal information obtained through the various input channels, it is possible to increase speed but decrease costs in controlling the controlled object.

The effects of the present disclosure are not limited to those mentioned above, and other effects not mentioned can be clearly understood by those skilled in the art from the following description.

DETAILED DESCRIPTION

Figure 1:
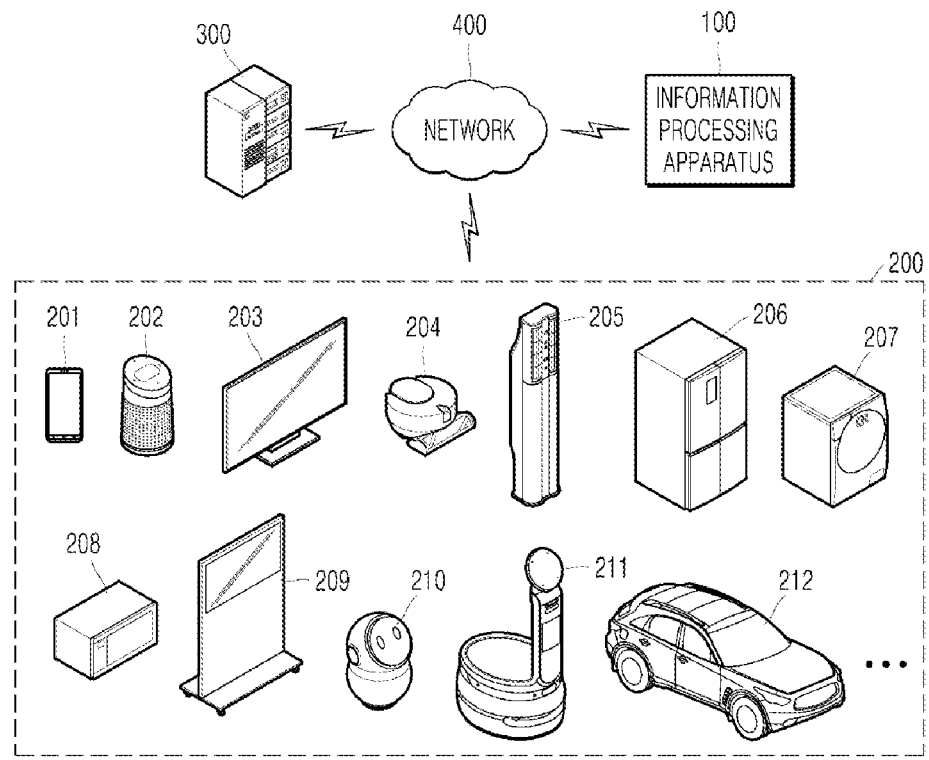
FIG. 1 is a diagram illustrating an information processing environment including an information processing apparatus, an electronic device, a server, and a network for connecting the foregoing components, according to one embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms first, second, and the like, may be used herein to describe various elements, these elements should not be limited by these terms. These terms are generally only used to distinguish one element from another.

Throughout the specification, "verbal information", which refers to information associated with wording, may include utterance information on a controlling subject (a talker), obtained through a microphone (an audio input interface 151 of FIG. 2) to control a controlled object. Here, the utterance information may include a wake-up word and a spoken utterance. However, the utterance information may include the spoken utterance and not the wake-up word. The wake-up word may be a specific command for activating a speech recognition function. Only when the wake-up word is included in the utterance information may the speech recognition function be activated. On the contrary, when the wake-up word is not included in the utterance information, the speech recognition function remains in an inactive state (for example, a sleep mode). The wake-up word may be preset, and stored in a memory (170 of FIG. 2) described below. In addition, the spoken utterance may include a speech command for substantially controlling the controlled object.

Throughout the specification, "non-verbal information" may include information for controlling the controlled object, other than the verbal information. In the present embodiment, the non-verbal information may include first to fifth non-verbal information.

The first non-verbal information may include an image obtained through a camera (120 of FIG. 2), to control the controlled object in combination with the verbal information. Here, the image obtained through the camera 120 may include one or more of image information including the controlled object and the controlling subject and image information on a gesture of the controlling subject pointing to the controlled object. One or more of a presence or absence of the controlling subject or the controlled object within a space, a location of the controlling subject or the controlled object within the space, a distance between the controlling subject and the controlled object, a gesture of the controlling subject, a skeleton of the controlling subject, a controlled object in a direction indicated by the controlling subject, and identification information (for example, ID) on the controlling subject and the controlled object may be analyzed using the first non-verbal information.

Second non-verbal information may include one or more previously distributed second sentences that are loaded from the memory (170 of FIG. 2), to control the controlled object in combination with the verbal information. In addition, the one or more previously distributed second sentences may include previous identification information on the controlled object and a control command previously distributed to the controlled object. In addition, the one or more previously distributed second sentences may include, for example, the time of distributing the second sentences, the number of times of repeatedly distributing the second sentences, and the information (the identification information) on which controlling subject (for example, which family member) generated the second sentences.

Third non-verbal information may include activity information on the controlling subject generated using one or more of the controlled object and a terminal of the controlling subject, that is loaded from the memory (170 of FIG. 2), to control the controlled object in combination with the verbal information. Here, the activity information on the controlling subject may include, for example, behavior information, interest information, preference information, retrieval information, usage information, operation information, and collection information, on the controlling subject. In this case, the preference information may include historical activity information regarding the controlling subject having controlled the controlled object. In addition, the historical activity information may include a control command preferred by a user and the identification information on the controlling object. When the number of times of repeatedly distributing the second sentence included in the second non-verbal information within a predetermined period of time (for example, one week) is equal to or greater than a predetermined number of times (for example, ten of times), the historical activity information may be generated and stored in the memory (170 of FIG. 2).

Fourth non-verbal information may include input information obtained through an input device, to control the controlled object in combination with the verbal information. Here, the input device may include one or more of input information through touching on a touch screen (a display 141 of FIG. 2), input information through an operation of a pen, a mouse, or a keyboard, and input information through an operation of a button (an operation interface 142 of FIG. 2) provided in the controlled object.

The fifth non-verbal information may include information on an environment surrounding the controlled object obtained through one or more sensors (130 of FIG. 2), to control the controlled object in combination with the verbal information. Here, the information on the environment may include information on, for example, weather, illumination, altitude, humidity, presence or absence of obstacles, and presence or absence of motion, around the controlled object.

In the present embodiment, it may be specified in the verbal and non-verbal information what part-of-speech the corresponding information may be used as, to generate a complete sentence (for example, the second sentence).

For example, all parts-of-speech, and nouns corresponding to the subject and object, are specified in the verbal information, so that all sentence components may be extracted from the verbal information. In addition, an adverb corresponding to an adverbial clause or conditional clause, nouns corresponding to the subject and object, and a verb corresponding to a command are specified in the first verbal information, so that the sentence components corresponding to the adverb, noun, and verb may be extracted from the first verbal information. In addition, the adverb corresponding to the adverb clause or conditional clause is specified in the second and third non-verbal information, so that the sentence component corresponding to the adverb may be extracted from the second and third non-verbal information. All parts-of-speech, and the noun corresponding to the object, are specified in the fourth non-verbal information, so that all sentence components may be extracted from the fourth non-verbal information. In addition, the adverb corresponding to the adverb clause or conditional clause is specified in the fifth non-verbal information, so that the sentence component corresponding to the adverb may be extracted from the fifth non-verbal information.

Throughout the specification, "coreference" may include wording that is used mainly to refer to something in the context. The coreference may include one or more of a pronoun for directly referring to a person, an object, a place, or a direction, an adverb for modifying other parts-of-speech in sentences, a determiner in front of a noun for specifying the reference of the noun, a preposition placed in front of the noun or pronoun to indicate relationship with another noun or pronoun, and a discourse marker for naturally connecting conversations. In addition, a headword may include wording that is inserted into heading entries in a dictionary to make headings easier to understand.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

Figure 2:
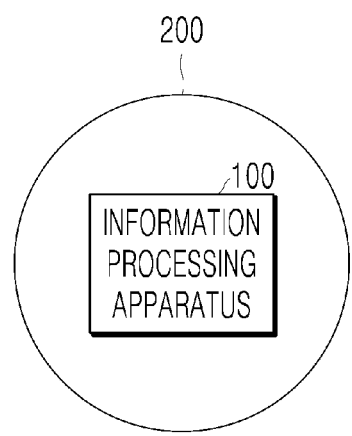
FIG. 2 is a diagram illustrating an implementation of an information processing apparatus, according to one embodiment of the present disclosure.

FIG. 1 is a diagram illustrating an information processing environment including an information processing apparatus, electronic devices, a server, and a network for connecting the foregoing components according to one embodiment of the present disclosure, and FIG. 2 is a diagram illustrating an implementation of the information processing apparatus according to the present embodiment. Referring to FIGS. 1 and 2, the information processing environment may include an information processing apparatus 100, electronic devices 200, a server 300, and a network 400.

The information processing apparatus 100 may generate a complete sentence by interpreting and supplementing verbal information and non-verbal information obtained through various channels, and control a controlled object with a control command included in the complete sentence.

To this end, the information processing apparatus 100 may obtain the verbal and non-verbal information related to a controlling subject and the controlled object. Here, the verbal information may be obtained through an audio input interface 151 of FIG. 3 described below. In addition, the non-verbal information may be obtained through one or more of a camera 120, a sensor 130, a user interface 140, and a memory 170 of FIG. 3 described below.

The information processing apparatus 100 may generate a first sentence including a coreference and a control command, by converting the verbal information into text. The information processing apparatus 100 may convert the verbal information into the verbal text by using a speech to text (STT) algorithm. The information processing apparatus 100 may generate the first sentence based on analysis of the verbal text. The information processing apparatus 100 may generate the first sentence by using some of natural language processing techniques (for example, morpheme analysis, part-of-speech tagging, and syntax analysis). In an alternative embodiment, the information processing apparatus 100 may generate the first sentence including a missing sentence component, based on analysis of a structure of the verbal text. The information processing apparatus 100 may analyze the sentence structure of the first sentence, compare the first sentence with a complete sentence composed of a subject, an object and a predicate, and extract the missing sentence component (for example, the subject or the predicate) from the first sentence.

The information processing apparatus 100 may assign identification information to the controlled object based on analysis of the non-verbal information. The information processing apparatus 100 may assign identification information to the controlled object based on analysis of skeleton information on the controlling subject obtained from first non-verbal information. In addition, the information processing apparatus 100 may assign identification information to the controlled objects, by using information on distances between the controlling subject and the controlled objects, that is obtained from the first non-verbal information. In addition, the information processing apparatus 100 may assign identification information to the controlled object, by using one or more pieces of previously distributed second sentence information obtained from second non-verbal information. In the present embodiment, the one or more previously distributed second sentences may include a control command previously distributed by the controlling subject and the identification information on the controlled object. From this, it may be seen that the previous controlling subject and the current controlling subject are the same.

The information processing apparatus 100 may generate, from the first sentence, a second sentence supplemented with the coreference by using the identification information on the controlled object. In an alternative embodiment, for the first sentence including the missing sentence component, the information processing apparatus 100 may generate the second sentence supplemented with the missing sentence component by using a group of control commands in text form indicating possible functions of the controlled object in its current state as known from the identification information on the controlled object. As described above, since it is specified in the verbal and non-verbal information what sentence component the corresponding information may be used as, to generate the second sentence, that is, the complete sentence, the information processing apparatus 100 may supplement the missing sentence component by using corresponding specified information.

The information processing apparatus 100 may call the controlled object by using the identification information on the controlled object included in the second sentence, and distribute the control command to the called controlled object.

Prior to distributing the control command, the information processing apparatus 100 may retrieve whether the same control command as the control command included in the second sentence is present among previously stored control commands, based on a result of comparing the control command with the previously stored control commands. The information processing apparatus 100 may transmit the second sentence together with a natural language processing request signal to a server 300 (an external natural language processor), based on the absence of the same control command among the previously stored control commands as the control command as a result of retrieving, and receive, from the server 300, a natural language processing result of the second sentence including the identification information on the controlled object and the control command. The information processing apparatus 100 may call the controlled object based on the natural language processing result of the second sentence received from the server 300, and distribute the control command to the called controlled object.

In general, since the obtained input information (the verbal and non-verbal information) should be transmitted to the server 300 to receive the natural language processing result from the server 300, the controlling subject's privacy may be leaked to the outside. However, according to the present embodiment, since the information processing apparatus 100 only needs to transmit the second sentence to the server 300, the controlling subject's privacy may be protected.

After generating the second sentence, the information processing apparatus 100 may retrieve whether historical activity information regarding the controlling subject having controlled the controlled object is present, by using the identification information on the controlling subject and the identification information on the controlled object. The information processing apparatus 100 may generate, based on the presence of the historical activity information as a result of retrieving, from the historical activity information, a third sentence in text form indicating the control command preferred by the controlling subject in relation to the controlled object and the identification information on the controlling subject.

The information processing apparatus 100 may call the controlled object by using the identification information on the controlled object included in the second and third sentences, and distribute control commands included in the second and the third sentences to the called controlled object. According to the information processing apparatus 100 according to the present embodiment, it is possible to provide a personalized service for a specific controlling subject with respect to the controlled object, by generating the third sentence based on the control command preferred by the controlling subject in relation to the controlled object and the identification information on the controlling subject.

Examples of the electronic device 200 (the controlled object) may include the following: a home appliance, such as a user terminal 201, an artificial intelligence speaker 202 that serves as a hub to connect other electronic devices to the network 400, a television (TV) 203, a robot cleaner 204, an air conditioner 205, a refrigerator 206, a washing machine 207, and a microwave oven 208; displays such as a signage 209, provided in public places or commercial spaces; a first communication robot 210 provided in a home and emotionally communicating with a user through, for example, gaze, emotion expression, and physical contact; a second communication robot 211 for performing, for example, patrol, guidance, cleaning, quarantine, and transportation in the public places (for example, airports, hospitals, and companies); and various devices corresponding to the Internet of Things (IoT). However, the examples of the electronic device 200 are not limited to those illustrated in FIG. 1. In the present embodiment, the information processing apparatus 100 may be provided inside the electronic device 200, allowing the electronic device 200 to serve as the information processing apparatus 100.

The user terminal 201 of the electronic device 200 may access an application or site for driving the information processing apparatus, and after passing an authentication process may be provided with a service for driving or controlling the information processing apparatus 100. In the present embodiment, the user terminal 201 that has passed the authentication process may drive the information processing apparatus 100, and control the operation of the information processing apparatus 100.

In the present embodiment, the user terminal 201 may be a desktop computer, a smartphone, a notebook, a tablet PC, a smart TV, a mobile phone, a personal digital assistant (PDA), a laptop, a media player, a micro server, a global positioning system (GPS) device, an electronic book terminal, a digital broadcasting terminal, a navigation, a kiosk, a MP4 player, a digital camera, a home appliance, and other mobile or non-mobile computing devices, which are operated by a user, but is not limited thereto. In addition, the user terminal 201 may be a wearable terminal, such as a watch, glasses, a hair band, and a ring, which has a communication function and a data processing function. Examples of the user terminal 201 are not limited thereto. Any terminal capable of performing web browsing may be used without limitation.

The server 300 may be a database server that provides, to the information processing apparatus 100, big data used to apply various artificial intelligence algorithms, as well as data processed according to a request from the information processing apparatus 100. Furthermore, the server 300 may include a web server or an application server that enables remote control of the operation of the information processing apparatus 100 by using an information processing apparatus-driving application or an information processing apparatus-driving web browser, which is provided in the user terminal 201.

In response to the information processing apparatus 100 requesting a natural language processing of the second or third sentence, the server 300 may receive the second or third sentence from the information processing apparatus 100, and then interpret and process the controlled object and the control command from the second or third sentence and transmit the result to the information processing apparatus 100. The server 300 may perform one or more of natural language understanding processing, dialog manager processing, natural language generation processing, and text to speech conversion processing, to interpret and process the second or third sentence. In addition, the server 300 may execute an artificial intelligence (AI) algorithm or a machine learning algorithm in a 5G communication environment to interpret and process the second or third sentence.

Artificial intelligence (AI) is an area of computer engineering science and information technology that studies methods to make computers mimic intelligent human behaviors such as reasoning, learning, self-improving, and the like. In addition, artificial intelligence does not exist on its own, but is rather directly or indirectly related to a number of other fields in computer science.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from inputted data.

The network 400 may serve to connect the information processing apparatus 100, the electronic device 200, and the server 300 to each other. The network 400 may include, but is not limited to, wired networks, such as local area networks (LANs), wide area networks (WANs), metropolitan area networks (MANs), and integrated service digital networks (ISDNs); or wireless networks, such as wireless LANs, CDMA, Bluetooth®, and satellite communications. In addition, the network 400 may transmit and receive information by using a short-distance communication or a long-distance communication. Here, the short-distance communication may include Bluetooth®, radio frequency identification (RFID), infrared data association (IrDA), ultra-wideband (UWB), ZigBee, and wireless fidelity (Wi-Fi) technologies, and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include a connection between network components, such as a hub, a bridge, a router, a switch, and a gateway. The network 400 may include one or more connected networks, for example, a multi-network environment, including a public network such as the Internet and a private network such as a secure enterprise private network. Access to the network 400 may be provided through one or more wired or wireless access networks. Furthermore, the network 400 may support 5G communications or Internet of Things (IoT) networks for exchanging and processing information between distributed components such as objects.

Figure 3:
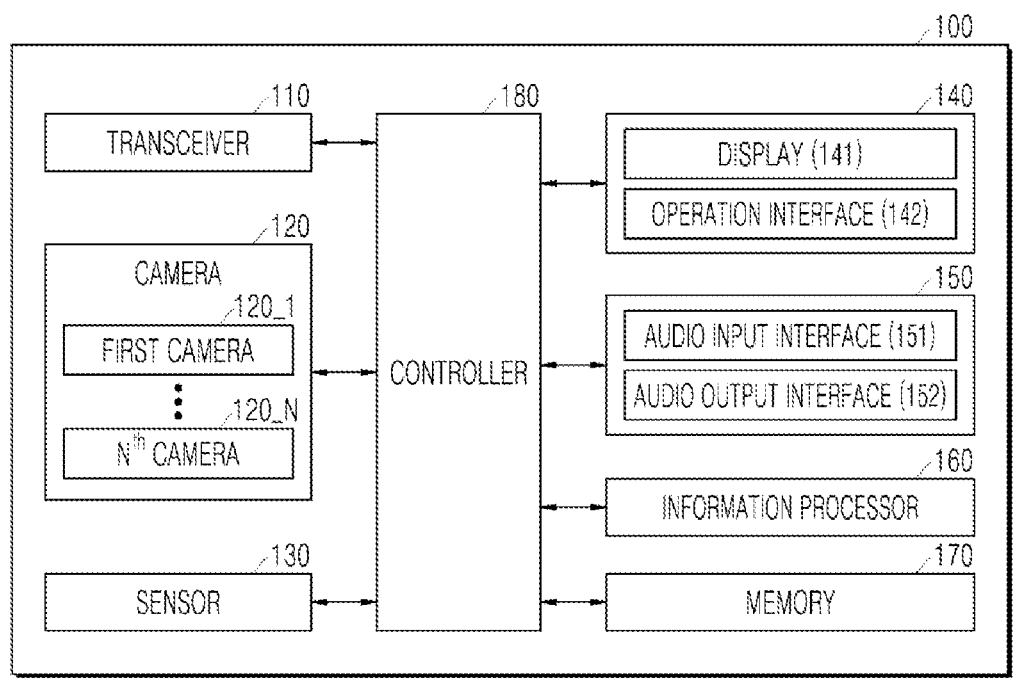
FIG. 3 is a diagram schematically illustrating a detailed configuration of an information processing apparatus, according to one embodiment of the present disclosure.

FIG. 3 is a diagram schematically illustrating a detailed configuration of an information processing apparatus, according to one embodiment of the present disclosure. In the following description, description overlapping with those of FIGS. 1 and 2 will be omitted. Referring to FIG. 3, the information processing apparatus 100 may include a transceiver 110, a camera 120, a sensor 130, a user interface 140, an audio processor 150, an information processor 160, a memory 170, and a controller 180.

The transceiver 110 may interwork with the network 400 to provide a communication interface used to transmit and receive signals in the form of packet data between the information processing apparatus 100, the electronic device 200, and the server 300. Furthermore, the transceiver 110 may serve to receive predetermined information request signal from the electronic device 200, and may serve to transmit information processed by the information processing apparatus 100 to the electronic device 200. In addition, the transceiver 110 may transmit the predetermined information request signal from the electronic device 200 to the server 300, receive a response signal processed by the server 300, and then transmit the response signal to the electronic device 200. In addition, the transceiver 110 may be a device including a hardware and software used to transmit and receive signals, such as control or data signals, to and from another network device via a wired or wireless connection.

In addition, the transceiver 110 may support a variety of object intelligent communications (for example, Internet of Things (IoT), Internet of Everything (IoE), and Internet of Small Things (IoST)), and may support, for example, machine to machine (M2M) communication, vehicle to everything (V2X) communication, and device to device (D2D) communication.

The camera 120 may include a first camera 120_1 to an $N^{th}$ camera 120_N. The camera 120 may capture an image of the controlling subject near the electronic device 200 under the control of the controller 180. For example, the camera 120 may capture, for example, an image of the controlling subject operating the electronic device 200, an image of the controlling subject speaking or pointing toward the electronic device 200, and an image of the controlling subject moving after finishing the operation of the electronic device 200. The camera 120 may refer to a camera for capturing a photographed thing in a photographing area by using, for example, a complementary metal-oxide semiconductor (COMS) module (not shown) or a charge coupled device (CCD) module (not shown). An inputted image frame may be provided to the COMS module or the CCD module through a lens (not shown), and the COMS module or the CCD module may convert an optical signal of the photographed thing that passed through the lens, into an electrical signal, and output the electrical signal. In addition, the camera 120 may be a PTZ camera having a pan/tilt/zoom function. The camera 120 may capture a still image, as well as a video composed of a number of still image frames. Meanwhile, the image captured and obtained by the camera 120 may be stored in the memory 170.

In the present embodiment, the information processing apparatus 100 may further include an image processor (not shown) to analyze and process the image captured by the camera 120. The image processor may be provided inside or outside the camera 120. The image processor may reduce a noise in an image frame captured by the camera 120, and perform image signal processing operations, such as gamma correction, color filter array interpolation, color matrix, color correction, and color enhancement, to improve an image quality. In addition, the image processor may perform functions, such as color processing, blur processing, edge enhancement processing, image interpretation processing, image recognition processing, and image effect processing. For example, the image processor may perform, as the image recognition, for example, facial recognition, scene recognition, and motion recognition. For example, the image processor may perform, for example, brightness level adjustment, color correction, contrast adjustment, contour enhancement adjustment, screen division processing, generation of, for example, an image of character, and synthesis of images.

The sensor 130 may include one or more sensors for detecting at least one of information on the controlling subject or information on an environment surrounding the information processing apparatus 100 or the electronic device 200. For example, the sensor 130 may include at least one of an obstacle detection sensor (for example, a proximity sensor and a Light Detection And Ranging (LiDAR) sensor), a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a fingerprint recognition sensor, an ultrasonic sensor, an optical sensor (for example, the camera 121), a microphone (for example, the audio input interface 151), an environment sensor (for example, a barometer, a hygrometer, a thermometer, a radioactivity detection sensor, a heat detection sensor, and a gas detection sensor), and a chemical sensor (for example, an electronic nose, a healthcare sensor, and a biometric sensor). Meanwhile, in the present embodiment, the information processing apparatus 100 may combine various information detected by at least two of the above-mentioned sensors, and use the combined information.

A display 141 of the user interface 140 may display a driving state of the information processing apparatus 100 under the control of the controller 180. Depending on the embodiment, the display 141 may form an inter-layer structure with a touch pad to be configured as a touch screen. In this case, the display 141 may also be used as an operation interface 142 capable of inputting information according to touching by the controlling subject. To this end, the display 141 may be configured as a touch-sensitive display controller or various other input/output controllers. As an example, the touch-sensitive display controller may provide output and input interfaces between the apparatus and the controlling subject. The touch-sensitive display controller may transmit and receive electric signals to and from the controller 180. In addition, the touch-sensitive display controller may display a visual output to the controlling subject, and the visual output may include text, graphics, image, video, and a combination thereof. The display 141 may be a predetermined display member, such as a touch-sensitive organic light emitting display (OLED), a liquid crystal display (LCD), or a light emitting display (LED).

The operation interface 142 of the user interface 140 may include a plurality of operation buttons (not shown) to transmit an input signal corresponding to each operation button to the controller 180. The operation interface 142 may be configured as a switch structure, or a sensor or button capable of recognizing touching or pressing by the controlling subject. In the present embodiment, the operation interface 142 may transmit, to the controller 180, an operation signal operated by the controlling subject, to check or modify various information on driving of the information processing apparatus 100, which is displayed on the display 141.

An audio input interface 151 of the audio processor 150 may receive the utterance information from the controlling subject and transmit it to the controller 180, and the controller 180 may perform speech recognition by using the utterance information on the controlling subject. To this end, the audio input interface 151 may include one or more microphones (not shown). In addition, the audio input interface 151 may include a plurality of microphones (not shown) to more accurately receive the utterance information on the controlling subject. Here, each of the plurality of microphones may be spaced apart from each other at different positions, and process the received utterance information on the controlling subject as an electrical signal.

In an alternative embodiment, the audio input interface 151 may use various noise removal algorithms to remove noise generated in the process of receiving the utterance information on the controlling subject. In an alternative embodiment, the audio input interface 151 may include various components for signal processing the utterance information on the controlling subject, such as a filter (not shown) for removing the noise when receiving the utterance information on the controlling subject and an amplifier (not shown) for amplifying and outputting the signal outputted from the filter.

Under the control of the controller 180, an audio output interface 152 of the audio processor 150 may output, as audio, for example, a notification message, such as a warning sound, an operation mode, an operation state, and an error state, and processing results corresponding to a speech command included in feedback utterance information on the controlling subject. In the present embodiment, the audio output interface 152 may output the utterance information on the second or third sentence generated by the information processor 160, or may output a result of the electronic device 200 operating according to the second or third sentence. The audio output interface 152 may convert electric signals from the controller 180 into audio signals, and output the audio signals. To this end, the audio output interface 152 may include, for example, a speaker.

The information processor 160 may obtain the verbal and non-verbal information related to the controlling subject and the controlled object. The information processor 160 may generate the first sentence including the coreference and the control command by converting the verbal information into text, or may generate the first sentence including the missing sentence component. The information processor 160 may assign the identification information to the controlled object based on analysis of the non-verbal information. The information processor 160 may generate, from the first sentence, the second sentence supplemented with the coreference by using the identification information on the controlled object, or may generate the second sentence supplemented with the missing sentence component by using a group of control commands in text form indicating possible functions of the controlled object in its current state as known from the identification information on the controlled object assigned based on extract of feature points. The information processor 160 may call the controlled object by using the identification information on the controlled object included in the second sentence, and distribute the control command to the called controlled object.

Prior to distributing the second sentence, the information processor 160 may retrieve whether the same control command as the control command included in the second sentence is present among previously stored control commands, based on a result of comparing the control command with the previously stored control commands, and transmit the second sentence together with a natural language processing request signal to the server 300, based on the absence of the same control command as the control command among the previously stored control commands. The information processor 160 may receive, from the server 300, a natural language processing result of the second sentence, call the controlled object by using the identification information on the controlled object included in a natural language processing result of the second sentence, and distribute the control command to the called controlled object.

The information processor 160 may assign identification information to the controlling subject by using the first non-verbal information, and retrieve whether, as the third non-verbal information, historical activity information regarding the controlling subject having controlled the controlled object is present. Based on the presence of the historical activity information, the information processor 160 may generate, from the historical activity information, a third sentence including the control command preferred by the controlling subject in relation to the controlled object and the identification information on the controlling subject. The information processor 160 may call the controlled object by using the identification information on the controlled object included in the second and third sentences, and distribute control commands included in the second and third sentences to the called controlled object.

In the present embodiment, the information processor 160 may perform learning in connection with the controller 180, or may receive learning results from the controller 180. In the present embodiment, the information processor 160 may be provided outside the controller 180 as shown in FIG. 3, or may be provided inside the controller 180 to serve as the controller 180. Hereinafter, the information processor 160 will be described in greater detail with reference to FIG. 4.

The memory 170, which may store a variety of information used to operate the information processing apparatus 100 and control software capable of operating the information processing apparatus 100, may include a volatile or non-volatile recording medium. For example, the memory 170 may store a preset wake-up word to determine the presence of a wake-up word from the utterance information on the controlling subject.

In addition, the memory 170 may store the verbal information obtained through the audio input interface 151, and the first, fourth, and fifth non-verbal information obtained through the camera 120, the sensor 130, and the user interface 140. The memory 170 may also store the second and third non-verbal information. The memory 170 may also store processing results of the information processor 160.

In addition, the memory 170 may store commands to be executed by the information processor 160, including the following: a command for obtaining the verbal information and the non-verbal information related to the controlling subject and the controlled object; a command for generating the first sentence including the coreference and the control command, by converting the verbal information into text; a command for converting the verbal information into text, and generating the first sentence including the missing sentence component based on analysis of the sentence structure; a command for assigning identification information to the controlled object and the controlling subject, respectively, based on analysis of the non-verbal information; a command for generating, from the first sentence, the second sentence supplemented with the coreference by using the identification information on the controlled object; a command for generating the second sentence supplemented with the missing sentence component by using the group of control commands in text form indicating possible functions of the controlled object in its current state as known from the identification information on the controlled object; a command for calling the controlled object by using the identification information on the controlled object included in the second sentence, and distributing the control command to the called controlled object; and the like.

Here, the memory 170 may include a magnetic storage medium or a flash storage medium, but the scope of the present disclosure is not limited thereto. The memory 170 may include an internal memory or an external memory, and may include a volatile memory, such as a DRAM, a SRAM or a SDRAM; a non-volatile memory, such as an one time programmable ROM (OTPROM), a PROM, an EPROM, an EEPROM, a mask ROM, a flash ROM, a NAND flash memory, or a NOR flash memory; a flash drive, such as an SSD, a compact flash (CF) card, an SD card, a Micro-SD card, a Mini-SD card, an Xd card or memory stick; or a storage device such as a HDD.

In the present embodiment, generating the first to third sentences used in simple speech recognition and controlling of the controlled object may be performed by the information processing apparatus 100, and interpreting or processing the second or third sentence may be performed by the server 300. For example, when the controlled object and the control command which are included in the second or third sentence are unable to be identified, the information processing apparatus 100 may request the server 300 to interpret or process the controlled object and the control command. The server 300 may receive the second or third sentence from the information processing apparatus 100, and may interpret and process the controlled object and the control command and then transmit the result to the information processing apparatus 100.

The controller 180 may transmit the verbal and non-verbal information to the information processor 160, and may provide a generation result of the second or third sentence received from the information processor 160, as visual information on the display 141 or as auditory information through the audio output interface 152. In addition, the controller 180 may provide an operation result of the controlled object according to the control command, as visual information on the display 141 or as auditory information through the audio output interface 152.

The controller 180, which may be a central processing unit, may control the entire operation of the information processing apparatus 100 by driving a control software stored in the memory 170. The controller 180 may include any type of device capable of processing data, such as a processor. Here, the "processor" may represent, for example, a hardware-embedded data processing device having a physically structured circuitry to perform functions represented by codes or commands included in a program. Examples of the hardware-embedded data processing device may include a processing device, such as a microprocessor, a central processing unit (CPU), a processor core, a multi-processor, an application-specific integrated circuit (ASIC), and a field programmable gate array (FPGA). However, the scope of the present disclosure is not limited thereto.

In the present embodiment, the controller 180 may perform machine learning such as deep learning on one or more of the utterance information and the image information so as to enable the information processing apparatus 100 to output an optimal information processing result. The memory 170 may store, for example, data used in the machine learning, and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on a result of complex calculations in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

Meanwhile, the controller 180 may be provided with an artificial neural network, and may generate sentences based on machine learning by using, as input data, at least one of the received utterance information or the received image information.

The controller 180 may include the artificial neural network such as a deep neural network (DNN) including, for example, a CNN, an RNN, and a DBN, and may train the DNN. As a machine learning method for the artificial neural network, both unsupervised learning and supervised learning may be used. The controller 180 may control an artificial neural network structure to enable the artificial neural network structure to be updated after being trained according to a setting.

Figure 4:
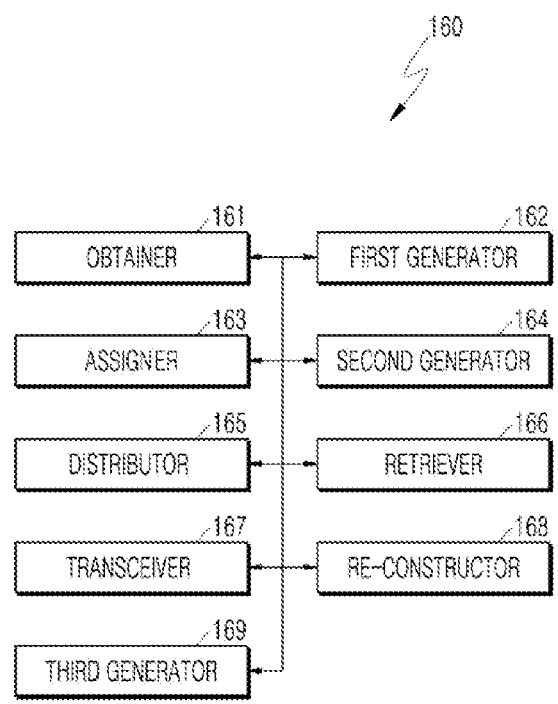
FIG. 4 is a diagram illustrating a detailed configuration of an information processor of the information processing apparatus shown in FIG. 3.

FIG. 4 is a diagram illustrating a detailed configuration of the information processor of the information processing apparatus shown in FIG. 3. In the following description, description overlapping with those of FIGS. 1 to 3 will be omitted. Referring to FIG. 4, the information processor 160 may include an obtainer 161, a first generator 162, an assigner 163, a second generator 164, a distributor 165, a retriever 166, a transceiver 167, a re-constructor 168, and a third generator 169. In an alternative embodiment, the information processor 160 may include one or more processors. In an alternative embodiment, the obtainer 161 to the third generator 169 may correspond to one or more processors. In an alternative embodiment, the obtainer 161 to the third generator 169 may correspond to software components configured to be executed by the one or more processors.

The obtainer 161 may obtain the verbal and non-verbal information related to the controlling subject and the controlled object. Here, the verbal information may be obtained through the audio input interface 151. In addition, the non-verbal information may be obtained through one or more of the camera 120, the sensor 130, the user interface 140, and the memory 170.

The first generator 162 may generate the verbal text by converting the verbal information into text, and generate the first sentence including the coreference and the control command, based on analysis of the verbal text.

The first generator 162 may use a speech to text (STT) algorithm to convert the verbal information into text to generate the verbal text. The first generator 162 may remove a noise signal from the verbal information, and extract a predetermined feature vector (parameter). Here, the predetermined feature vector may include, for example, linear predictive coefficients (LPC) cepstrum, perceptual linear prediction (PLC) cepstrum, mel frequency cepstral coefficients (MFCC), and filterbank energy. The first generator 162 may find a word most similar to the extracted feature vector with reference to a dictionary including vocabularies of the recognized objects which have been already obtained in the learning process, and may convert the extracted feature vector into the most similar word text.

The first generator 162 may generate the first sentence including the coreference and the control command, based on analysis of the verbal text. The first generator 162 may analyze the verbal text in terms of morpheme units based on a morpheme dictionary, and may tag parts-of-speech to morpheme units. Here, the morphemes unit may include, for example, a general noun/NNG, a subject particle/JKS, an adjective/VA, a conjunctive ending/EF, a period, a question mark, and an exclamation mark/SF.

The first generator 162 may analyze the syntax of the morphemes tagged with the parts-of-speech, based on a predefined rule and a dictionary, and then generate the first sentence. Here, the syntax may refer to chunks in which the morpheme units are combined into larger units, such as a noun phrase, a verb phrase, and an adjective phrase, after analyzing the verbal text in terms of the morpheme units and tagging the parts-of-speech to the morpheme units. The first generator 162 may analyze the syntax of the verbal text, based on the predefined rule and the dictionary, such as a system dictionary, a user dictionary, and a stopword dictionary, which are stored in the memory 170.

In an alternative embodiment, the first generator 162 may generate the first sentence including the missing sentence component, based on analysis of the verbal text. The first generator 162 may compare the first sentence with a complete sentence composed of a subject, an object and a predicate, and extract the missing sentence component (for example, the subject and the predicate) from the first sentence. For example, when the first sentence is "TV", the first generator 162 may determine that, with respect to the object (TV), the subject to process the TV and the predicate for how to process the TV are missing. Accordingly, the first generator 162 may extract the subject and the predicate as the missing sentence components, from the exemplary first sentence described above.

The assigner 163 may assign the identification information to the controlled object and the controlling subject, respectively, based on analysis of the non-verbal information.

The assigner 163 may obtain skeleton information on the controlling subject from the first non-verbal information including image information on a gesture of the controlling subject. The assigner 163 may further include a skeleton analyzer (not shown) to obtain the skeleton information. The skeleton analyzer may determine positions and orientations of at least both shoulders, elbows, both wrists, both hips, both knees, and both ankles, based on angles of the joints and distances between the joints determined through analysis of a shape of a human body. The assigner 163 may specify a direction indicated by the controlling subject by using positions of shoulder joints and finger joints of the controlling subject, based on the skeleton information. In an alternative embodiment, the assigner 163 may use a deep neural network model that has been pre-trained to specify a direction indicated by an object in an image based on analysis of a gesture of the object, and then specify a direction indicated by the controlling subject based on analysis of a gesture of the controlling subject included in image information on the gesture. The assigner 163 may determine the controlled object in the direction indicated by the controlling subject. The assigner 163 may select, based on a result of comparing the feature points of the determined controlled object with the feature points of the objects stored in the memory 170, an object having feature points corresponding to the feature points of the controlled object, and assign the identification information on the selected object to the controlled object.

In an alternative embodiment, the assigner 163 may identify controlling subjects based on feature points extracted using, as the first non-verbal information, the image information including the controlling subject, select, based on a result of comparing the feature points of the controlling subject with the feature points of users stored in the memory 170, a user having feature points corresponding to the feature points of the controlling subject, and assign the identification information on the selected user to the controlling subject.

In an alternative embodiment, the assigner 163 may identify objects (the controlling subject and the controlled object) through various methods, and assign identification information to the objects. Here, identifying the objects may mean identifying types of the objects through, for example, a support vector machine (SVM) algorithm or a neural networks (NN) algorithm. Identifying the types of the objects may mean knowing, for example, names of the objects or what the objects are. For example, when the object is the controlling subject, the assigner 163 may know a name or identification information (ID) of the controlling subject. In addition, when the object is the controlled object, the assigner 163 may know, for example, a name, location, and identification information (ID) of the electronic device 200. In this case, the assigner 163 may refer to feature and identification information on the controlling subject and feature and identification information on the controlled object that have been previously stored in the memory 170. Accordingly, the assigner 163 may compare a partial image of the object with the existing data to find the controlling subject or the controlled object having the same image as that object from the existing data, and then find the type, such as a name or identification information, of that object. Subsequently, the assigner 163 may convert the partial image of the object into an identification information text.

Here, the SVM algorithm, which is an algorithm capable of finding a hyperplane capable of best identifying given data, may use only a support vector located at a boundary between different classes of data. The NN algorithm, which is an algorithm capable of learning weights to maximize a likelihood defined by energy and minimize an error, may use all data to learn all weight matrices between layers.

In an alternative embodiment, the assigner 163 may use a deep neural network model that has been pre-trained to identify the corresponding type of the object based on analysis of the feature points of the image, and then determine, based on the feature points extracted from the image information, whether the object included in the image information is the controlled object or the controlling subject. Here, training the deep neural network model may be performed through supervised learning, and learning may be performed using data in which various feature information extracted from numerous objects are labeled with the object corresponding to the feature information included in the image.

In an alternative embodiment, the assigner 163 may calculate distances from the controlling subject to each of controlled objects, by using, as the first non-verbal information, the image information including the controlled objects and the controlling subject. The assigner 163 may determine the controlled object according to one of the calculated distances that corresponds to the coreference. For example, when the coreference is "this", the assigner 163 may determine the controlled object that is closest to the controlling subject. In addition, when the coreference is "that", the assigner 163 may determine the controlled object that is farthest away from the controlling subject. The assigner 163 may select an object having a feature point corresponding to a feature point of the controlled object, based on a result of comparing the feature point of the determined controlled object with previously stored feature points of objects, and then assign identification information on the selected object to the controlled object.

In an alternative embodiment, the assigner 163 may extract, from the second non-verbal information as one or more previously distributed second sentences, previous identification information on the controlled object and previous control commands that have been determined by the controlling subject. The assigner 163 may determine whether the previous control commands and the control command included in the first sentence are control commands for the same controlled object. The assigner 163 may determine whether the previous control commands and the control command included in the first sentence are control commands determined by the same controlling subject. When the previous control commands and the control command included in the first sentence are control commands for the same controlled object and are determined by the same controlling subject, the assigner 163 may assign the previous identification information on the controlled object as the identification information on the controlled object included in the first sentence.

The second generator 164 may generate, from the first sentence, a second sentence supplemented with the coreference by using the identification information on the controlled object. Based on analysis of the skeleton information, the second generator 164 may generate the second sentence including the identification information on the controlled object in the direction indicated by the controlling subject and the control command, by supplementing the coreference with the identification information on the controlled object. Based on a result of calculating the distance between the controlling subject and the controlled object as well as analysis of the meaning of the coreference, the second generator 164 may generate the second sentence including the identification information on the controlled object at a certain distance from the user and the control command, by supplementing the coreference with the identification information on the controlled object. The second generator 164 may determine that the control command included in the previously distributed second sentence and the control command included in the first sentence are control commands for the same controlled object and the same controlling subject. Subsequently, the second generator 164 may generate the second sentence including the identification information on the controlled object included in the previously distributed second sentence and the control command, by supplementing the coreference with the identification information on the controlled object.

In an alternative embodiment, the second generator 164 may generate the second sentence supplemented with the missing sentence component by using a group of control commands in text form indicating possible functions of the controlled object in its current state as known from the identification information on the controlled object. For example, when the missing sentence component in the first sentence is the subject, the second generator 164 may generate the second sentence supplemented with the missing sentence component (the subject) by using the identification information on the controlling subject. In addition, when the missing sentence component in the first sentence is the predicate, the second generator 164 may check a current operation state of the controlled object by using the identification information on the controlled object. Subsequently, the second generator 164 may generate the second sentence supplemented with the missing sentence component (the predicate) by using one of the group of control commands in text form indicating possible functions of the controlled object in its current state. For example, when the identification information on the controlled object (TV 203) is TV_C_1 and the current state of the TV 203 is a power-off state, the only possible function of the TV 203 in its current state is a power-on function, and the second generator 164 may generate the second sentence supplemented with the missing sentence component (the predicate) by using the control command (TV_ON) in text form indicating power-on.

The distributor 165 may call the controlled object by using the identification information on the controlled object included in the second sentence, and distribute the control command to the called controlled object.

Before the second generator 164 transmits the second sentence to the distributor 165, the retriever 166 may retrieve whether the same control command as the control command included in the second sentence is present among control commands previously stored in the memory 170, based on a result of comparing the control command with the control commands previously stored in the memory 170.

When the same control command as the control command included in the second sentence is present in the memory 170, the retriever 166 may transmit the retrieval result to the second generator 164, and the second generator 164 may transmit the second sentence to the distributor 165.

However, when the same control command as the control command included in the second sentence is not present in the memory 170, since the controlled object is unable to be controlled, the retriever 166 may transmit the retrieval result to the transceiver 167, and the transceiver 167 may transmit the second sentence together with a natural language processing request signal to the server 300.

Here, before transmitting the second sentence to the server 300, the transceiver 167 may transmit the second sentence to the re-constructor 168. The re-constructor 168 may reconstruct the second sentence into a grammatical sentence. The re-constructor 168 may transmit the reconstructed second sentence to the transceiver 167. The transceiver 167 may transmit the reconstructed second sentence to the server 300.

Subsequently, the transceiver 167 may receive, from the server 300, a natural language processing result of the second sentence. Here, the natural language processing result of the second sentence may include at least the identification information on the controlled object and the control command for controlling the controlled object. The transceiver 167 may transmit, to the distributor 165, the natural language processing result of the second sentence received from the server 300. The distributor 165 may call the controlled object by using the natural language processing result of the second sentence, and distribute the control command to the called controlled object.

In addition, after the second generator 164 generates the second sentence, the retriever 166 may retrieve whether as the third verbal information, historical activity information regarding the controlling subject having controlled the controlled object is present in the memory 170.

When the historical activity information is present in the memory 170, the retriever 166 may transmit the retrieval result to the third generator 169.

The third generator 169 may generate, from the historical activity information, the third sentence in text form indicating the control command preferred by the controlling subject in relation to the controlled object and the identification information on the controlling subject.

For example, in the above-described example, it was assumed that the utterance text is "TV", and that the second sentence "The identification information (for example, the dad) on the controlling subject is performing the control command (TV_ON) with respect to the identification information (the TV 203, TV_C_1) on the controlled object. Thus, turn on the TV (according to the dad's instruction)" is generated. When the historical activity information stored in the memory 170 indicates that since the identification information (the dad) on the controlling subject frequently watches channel number 7 on the controlled object (the TV 203), the dad's preferred TV channel number is 7, the third generator 169 may generate the sentence "Switch to channel number 7" as the control command preferred by the controlling subject in relation to the controlled object.

The second sentence generated by the second generator 164 and the third sentence generated by the third generator 169 may be transmitted to the distributor 165. The distributor 165 may call the controlled object by using the identification information on the controlled object included in the second and third sentences, and distribute the control commands included in the second and third sentences to the called controlled object. For example, even if the controlling subject (the dad) simply speaks "TV", the controlled object (the TV 203) turns on and switches to channel number 7, so that the dad may watch channel number 7.

In an alternative embodiment, the distributor 165 may synthesize the second sentence and the third sentence to generate a new control command for controlling the controlled object. In the above-described example, the distributor 165 may synthesize the control command "Turn on TV (TV_ON)" included in the second sentence and the control command "Switch to channel number 7" included in the third sentence. In this case, by using a deep neural network model trained through word embedding, it may be understood that the sentence "Turn on" means turning on the TV 203 of a plurality of controlled objects, and the sentence "Switch" does not mean turning on the TV 203, but means switching to channel number 7. Accordingly, the distributor 165 may generate the sentence "Switch to channel number 7" as a new control command, and distribute the new control command to the called controlled object (the TV 203).

Before the second generator 164 and the third generator 169 transmit the second sentence and the third sentence to the distributor 165, respectively, the retriever 166 may retrieve whether the same control commands as the control commands included in the second and third sentences are present among the control commands previously stored in the memory 170, based on a result of comparing the control commands with the control commands previously stored in the memory 170.

When the same control commands as the control commands included in the second and third sentences are present in the memory 170, the retriever 166 may transmit the retrieval result to the second generator 164 and the third generator 169, the second generator 164 may transmit the second sentence to the distributor 165, and the third generator 169 may transmit the third sentence to the distributor 165.

However, when the same control command as the control commands included in the second and third sentences is not present in the memory 170, since the controlled object is unable to be controlled, the retriever 166 may transmit the retrieval result to the transceiver 167, and the transceiver 167 may transmit the second and third sentences together with a natural language processing request signal to the server 300.

Here, before transmitting the second and third sentences to the server 300, the transceiver 167 may transmit the second and third sentences to the re-constructor 168, and the re-constructor 168 may reconstruct the second and third sentences into grammatical sentences. The re-constructor 168 may transmit the reconstructed second and third sentences to the transceiver 167. The transceiver 167 may transmit the reconstructed second and third sentences to the server 300.

Subsequently, the transceiver 167 may receive, from the server 300, natural language processing results of the second and third sentences. Here, the natural language processing results of the second and third sentences may include at least the identification information on the controlled object and two control commands for controlling the controlled object. The transceiver 167 may transmit, to the distributor 165, the natural language processing results of the second and third sentences received from the server 300. The distributor 165 may call the controlled object by using the natural language processing results of the second and third sentences, and distribute two control commands to the called controlled object.

Figure 5A:
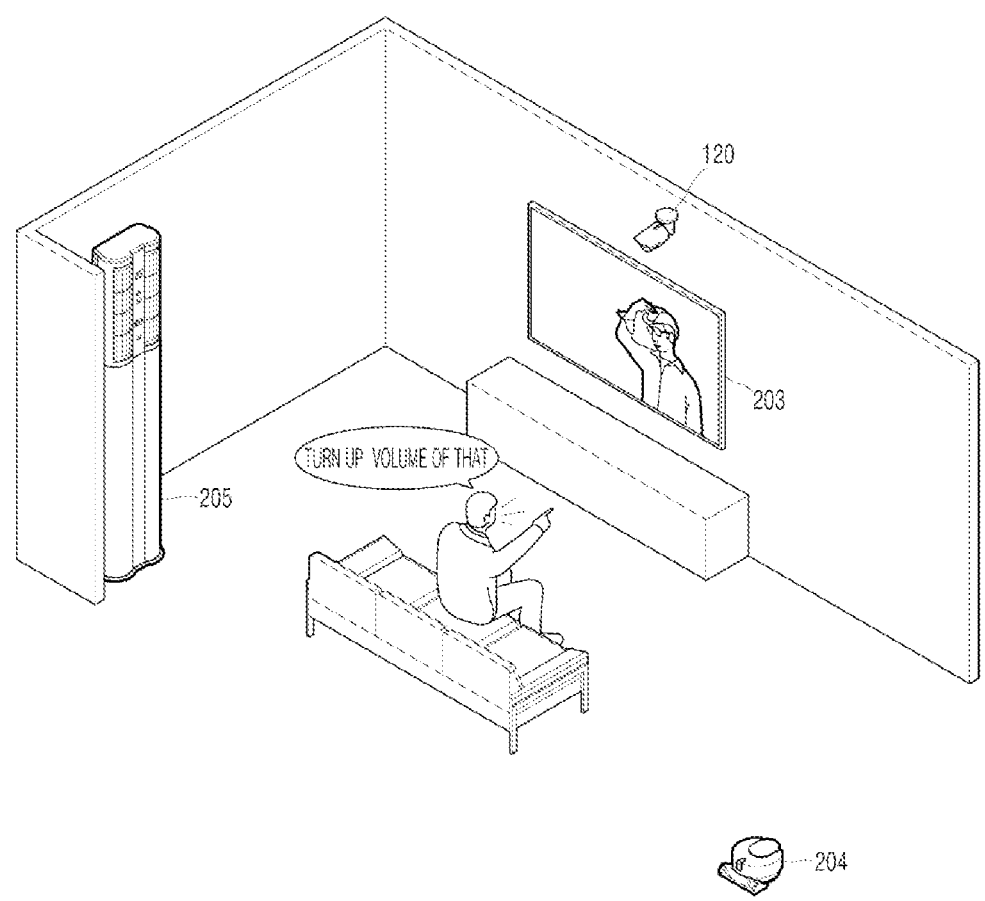
FIGS. 5A and 5B are diagrams illustrating information processing of an information processing apparatus, according to one embodiment of the present disclosure.
Figure 5B:
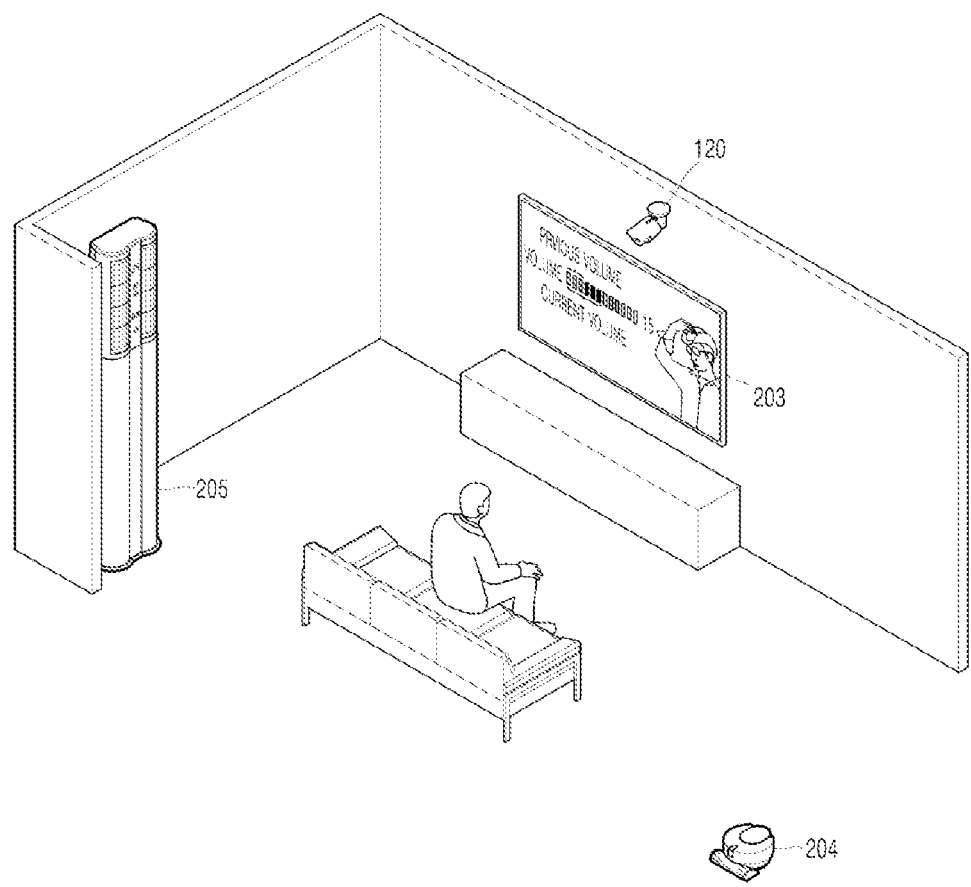

FIGS. 5A and 5B are diagrams illustrating information processing of the information processing apparatus, according to the present embodiment. In the following description, description overlapping with those of FIGS. 1 to 4 will be omitted. FIG. 5A illustrates a situation in which the controlling subject speaks "Turn up the volume of that" as the verbal information while pointing to the TV 203, and FIG. 5B illustrates a situation in which the TV 203 turns on after the controlling subject speaks "Turn up the volume of that".

Referring to FIG. 5A, when the controlling subject speaks "Turn up the volume of that" as the verbal information, the information processing apparatus 100 may convert the verbal information into the verbal text "Turn up the volume of that". The information processing apparatus 100 may generate the first sentence including the coreference ("that") and the control command (Turn up the volume; volumn_up), based on analysis of the sentence structure of the verbal text.

The information processing apparatus 100 may obtain the skeleton information from the first non-verbal information including an image of a gesture of the controlling subject. The information processing apparatus 100 may then determine the controlled object in the direction indicated by the controlling subject through the positions of shoulder joints and finger joints of the controlling subject, based on the skeleton information. It may be seen from FIG. 5A that the controlled object indicated by the controlling subject is the TV 203. The information processing apparatus 100 may select, based on a result of comparing the feature points of the determined controlled object with the feature points of the objects stored in the memory 170, the object (the TV 203) having feature points corresponding to the feature points of the controlled object, and assign the identification information (for example, TV_C_1) on the selected object to the TV 203.

The information processing apparatus 100 may generate the second sentence supplemented with the coreference included in the first sentence by using the identification information (TV_C_1) on the TV 203. For example, the second sentence may include the identification information (TV_C_1) and the control command (volumn_up) of the TV 203.

The information processing apparatus 100 may call the TV 203 by using the identification information (TV_C_1) on the TV 203 included in the second sentence, and distribute the control command (volume up) included in the second sentence to the called TV 203 to turn up the volume of the TV 203 as shown in FIG. 5B.

Figure 6A:
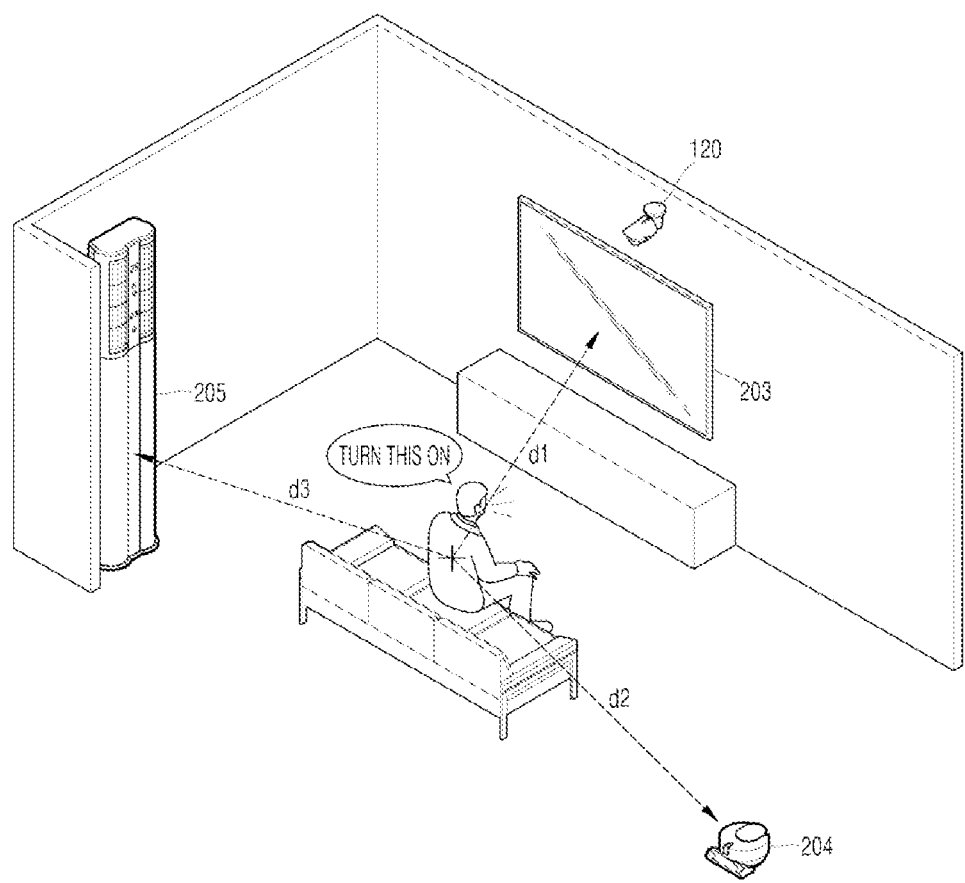
FIGS. 6A and 6B are diagrams illustrating information processing of an information processing apparatus, according to another embodiment of the present disclosure.
Figure 6B:
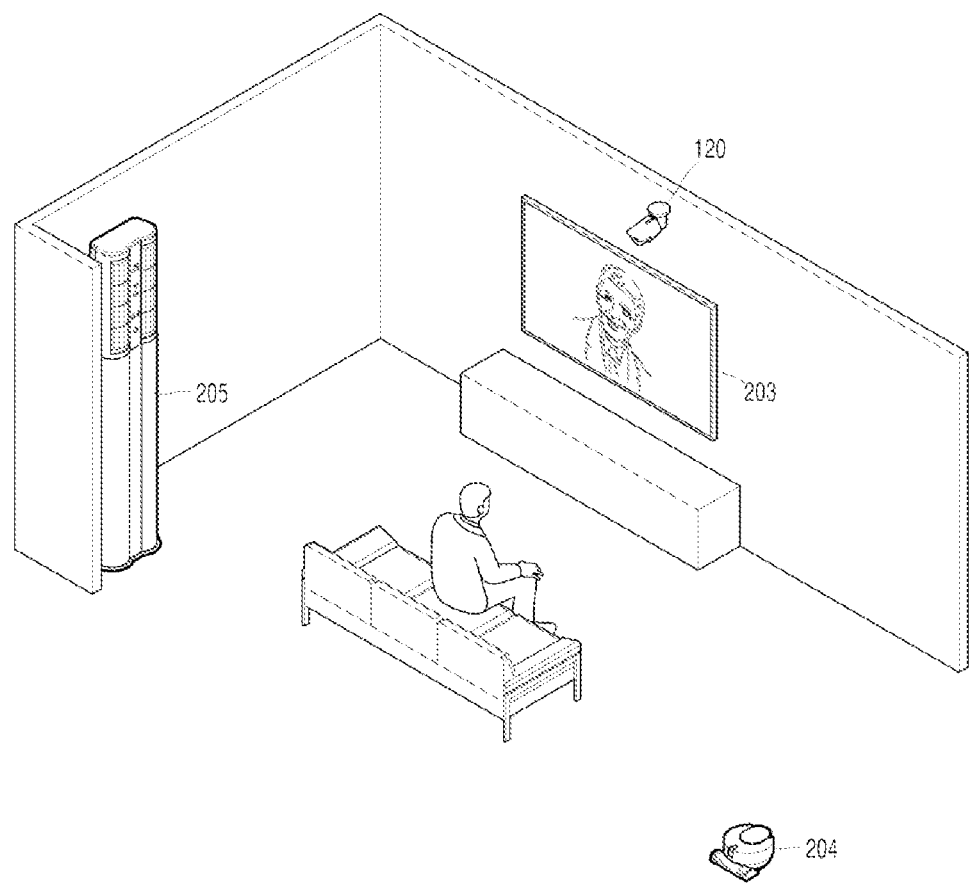

FIGS. 6A and 6B are diagrams illustrating information processing of the information processing apparatus, according to another embodiment. In the following description, description overlapping with those of FIGS. 1 to 5 will be omitted. FIG. 6A illustrates a situation in which the controlling subject speaks "Turn this on" as the verbal information, and FIG. 6B illustrates a situation in which the TV 203 turns on after the controlling subject speaks "Turn this on".

Referring to FIG. 6A, when the controlling subject speaks "Turn this on" as the verbal information, the information processing apparatus 100 may convert the verbal information into verbal text "Turn this on". The information processing apparatus 100 may generate the first sentence including the coreference ("this") and the control command (Turn this on; turn_on), based on analysis of the sentence structure of the verbal text.

By using the first non-verbal information including the image of the controlling subject and the controlled objects (the TV 203, a robot cleaner 204, and an air conditioner 205), the information processing apparatus 100 may calculate a distance d1 between the controlling subject and the TV 203, a distance d2 between the controlling subject and the robot cleaner 204, and a distance d3 between the controlling subject and the air conditioner 205. It may be seen from FIG. 6A that a result of calculating the distances is d1<d3<d2.

The information processing apparatus 100 may determine a controlled object based on the calculated distance that corresponds to the meaning of the coreference, among the calculated distances. For example, when the coreference is "this", the information processing apparatus 100 may determine the controlled object that is closest to the controlling subject. In addition, when the coreference is "that", the information processing apparatus 100 may determine the controlled object that is farthest away from the controlling subject. In the case of FIG. 6A, since the coreference is "this", the information processing apparatus 100 may determine the controlled object at the closest distance d1 from the control subject.

The information processing apparatus 100 may select, based on a result of comparing the feature points of the determined controlled object with the feature points of the objects stored in the memory 170, an object (the TV 203) having feature points corresponding to the feature points of the controlled object, and assign the identification information (for example, TV_C_1) on the selected object to the TV 203.

The information processing apparatus 100 may generate the second sentence supplemented with the coreference included in the first sentence by using the identification information (TV_C_1) on the TV 203. For example, the second sentence may include the identification information (TV_C_1) and the control command (turn_on) of the TV 203.

The information processing apparatus 100 may call the TV 203 by using the identification information (TV_C_1) on the TV 203 included in the second sentence, and distribute the control command (turn_on) included in the second sentence to the called TV 203 to turn on the TV 203 as shown in FIG. 6B.

Figure 7A:
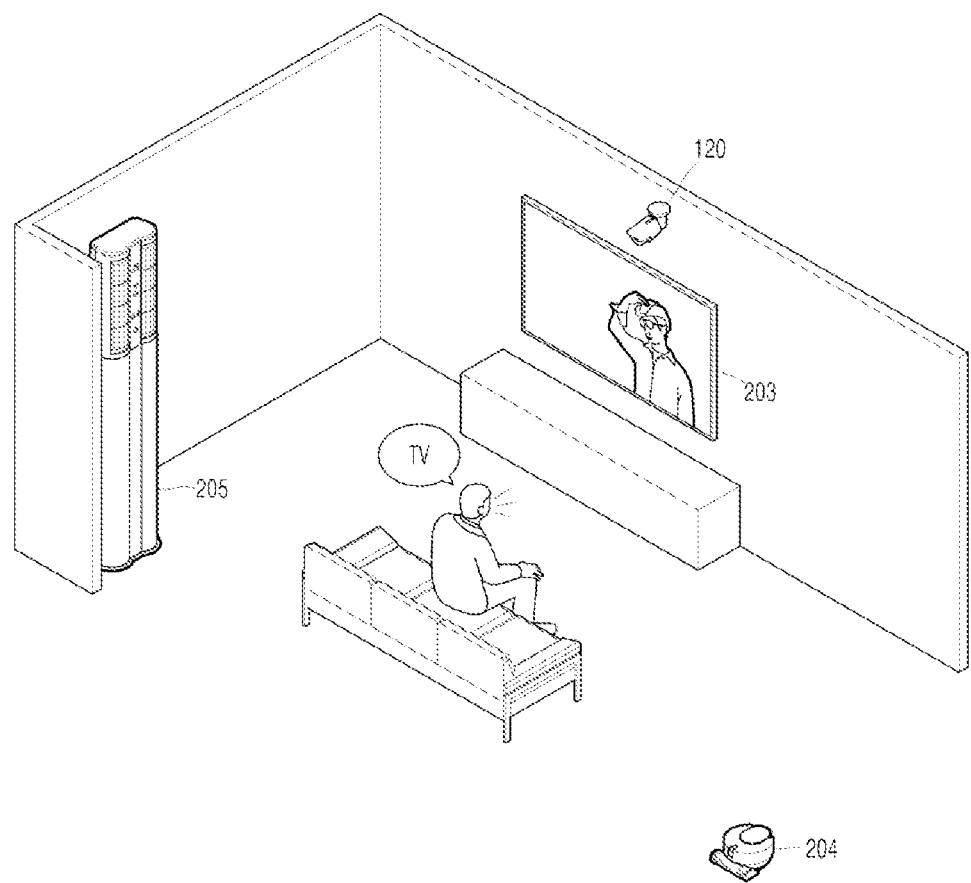
FIGS. 7A and 7B are diagrams illustrating information processing of an information processing apparatus, according to still another embodiment of the present disclosure.
Figure 7B:
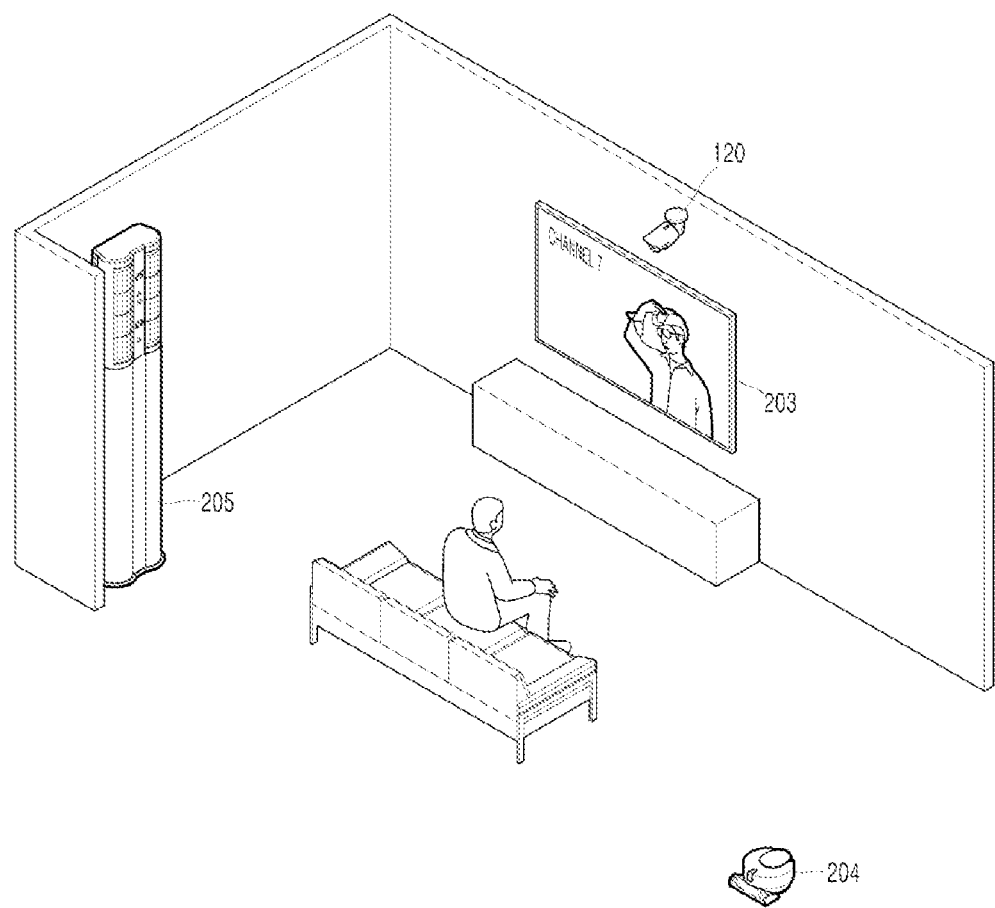

FIGS. 7A and 7B are diagrams illustrating information processing of the information processing apparatus, according to still another embodiment. In the following description, description overlapping with those of FIGS. 1 to 6 will be omitted. FIG. 7A illustrates a situation in which the controlling subject speaks "TV" as the verbal information, and FIG. 7B illustrates that the TV 203 turns on after the controlling subject speaks "TV" and the controlling subject's preferred channel number 7 is then displayed.

Referring to FIG. 7A, when the controlling subject speaks "TV" as the verbal information, the information processing apparatus 100 may convert the verbal information into verbal text "TV". In addition, based on analysis of the first non-verbal information obtained through the camera 120, the information processing apparatus 100 may assign the identification information (for example, the dad) to the controlling subject, and assign the identification information (for example, TV_C_1) to the controlled object (the TV 203).

Based on a result of comparing the first sentence "TV" of the verbal text with a complete sentence composed of a subject, an object, and a predicate, the information processing apparatus 100 may determine that missing sentence components in the first sentence are the subject and the predicate.

The information processing apparatus 100 may use a predetermined supplementary information generation condition for supplementing the subject with the identification information on the controlling subject, supplementing the object with the identification information on the controlled object, and supplementing the predicate with the control command for the controlled object. The information processing apparatus 100 may supplement the missing sentence component (the subject) with the identification information (the dad) on the controlling subject. To supplement the missing sentence component (the predicate), the information processing apparatus 100 may first determine, based on the identification information (TV_C_1) on the controlled object, that the current operation state of the TV 203 is a power-off state. Subsequently, when the possible function of the TV 203 in its current state is a power-on function, the information processing apparatus 100 may generate the second sentence supplemented with the missing sentence component (the predicate) by using the control command (TV_ON) in a text form indicating "power-on". The information processing apparatus 100 may generate the sentence "The identification information (for example, the dad) on the controlling subject is performing the control command (TV_ON) with respect to the identification information (the TV 203, TV_C_1) on the controlled object" as the second sentence.

In addition, the information processing apparatus 100 may retrieve whether the historical activity information regarding the controlling subject having controlled the controlled object is present in the memory 170, may determine, from the historical activity information if present in the memory 170, that since the identification information (the dad) on the controlling subject frequently watches channel number 7 on the controlled object (the TV 203), the dad's preferred TV channel number is 7, and may generate the sentence "Switch to channel number 7" as the third sentence.

The information processing apparatus 100 may call the TV 203 by using the identification information (TV_C_1) on the TV 203 included in the second and third sentences, and distribute the control command (TV_ON) included in the second sentence and the control command (Switch to channel number 7) included in the third sentence to the called TV 203 to turn on the TV 203 and display channel number 7 as shown in FIG. 7B. In this manner, even if the dad simply speaks "TV", the TV 203 may turn on, and the dad may watch the preferred channel number 7.

Figure 8:
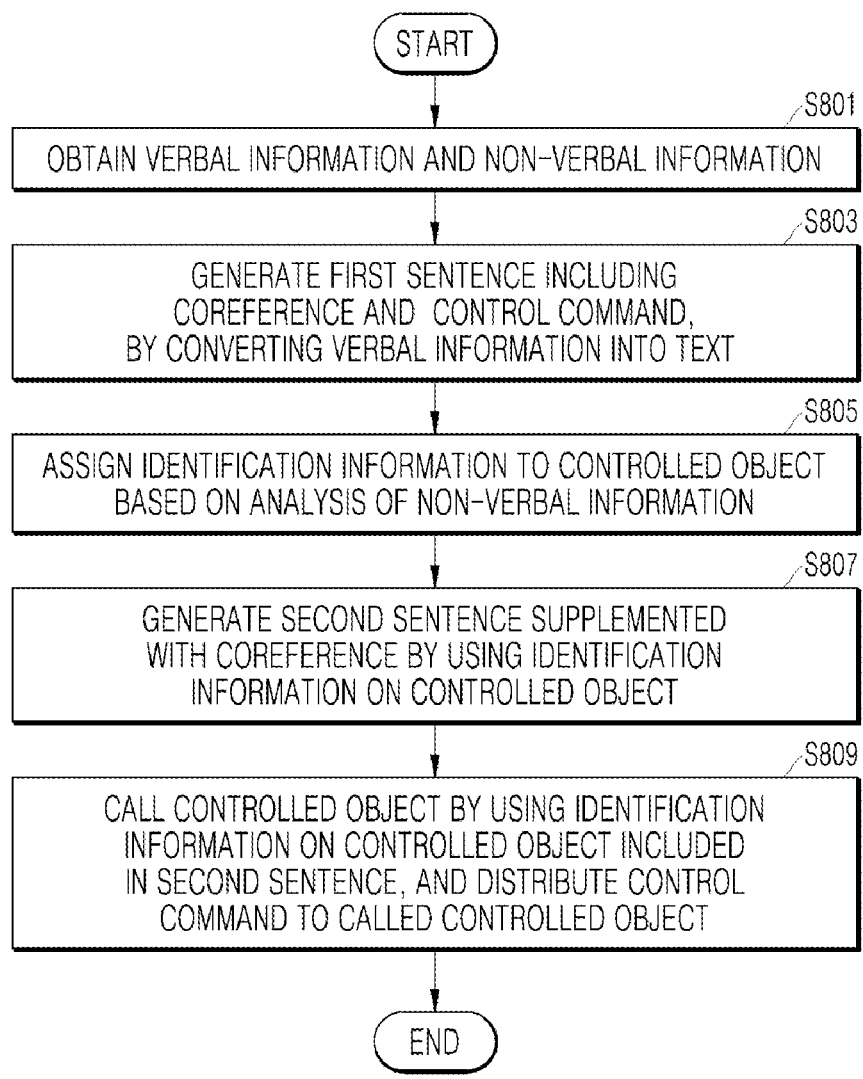
FIG. 8 is a flowchart illustrating an information processing method, according to one embodiment of the present disclosure.

FIG. 8 is a flowchart illustrating an information processing method, according to the present embodiment. In the following description, description overlapping with those of FIGS. 1 to 7 will be omitted.

Referring to FIG. 8, at S801, the information processing apparatus 100 obtains the verbal information and the non-verbal information related to the controlling subject and the controlled object.

At S803, the information processing apparatus 100 generates the first sentence including the coreference and the control command, by converting the verbal information into text. In an alternative embodiment, the information processing apparatus 100 may generate the first sentence including the missing sentence component, based on analysis of a result of converting the verbal information into text.

At S805, the information processing apparatus 100 assigns the identification information to the controlled object based on analysis of the non-verbal information. The information processing apparatus 100 may assign the identification information to the controlled object based on extraction of the feature points and analysis of the skeleton information on the controlling subject obtained from first non-verbal information. In addition, the information processing apparatus 100 may assign the identification information to the controlled objects, by using extraction of the feature points, the meaning of the coreference, and information on distances between the controlling subject and the controlled objects, that are obtained from the first non-verbal information. In addition, the information processing apparatus 100 may assign identification information to the controlled object by using one or more pieces of previously distributed second sentence information obtained from second non-verbal information. In the present embodiment, the information processing apparatus 100 may assign the identification information to the controlling subject based on the extraction of the feature points.

At S807, the information processing apparatus 100 generates, from the first sentence, the second sentence supplemented with the coreference by using the identification information on the controlled object. In an alternative embodiment, for the first sentence including the missing sentence component, the information processing apparatus 100 may generate the second sentence supplemented with the missing sentence component by using a group of control commands in text form indicating possible functions of the controlled object in its current state as known from the identification information on the controlled object.

At S809, the information processing apparatus 100 calls the controlled object by using the identification information on the controlled object included in the second sentence, and distributes the control command to the called controlled object.

Figure 9:
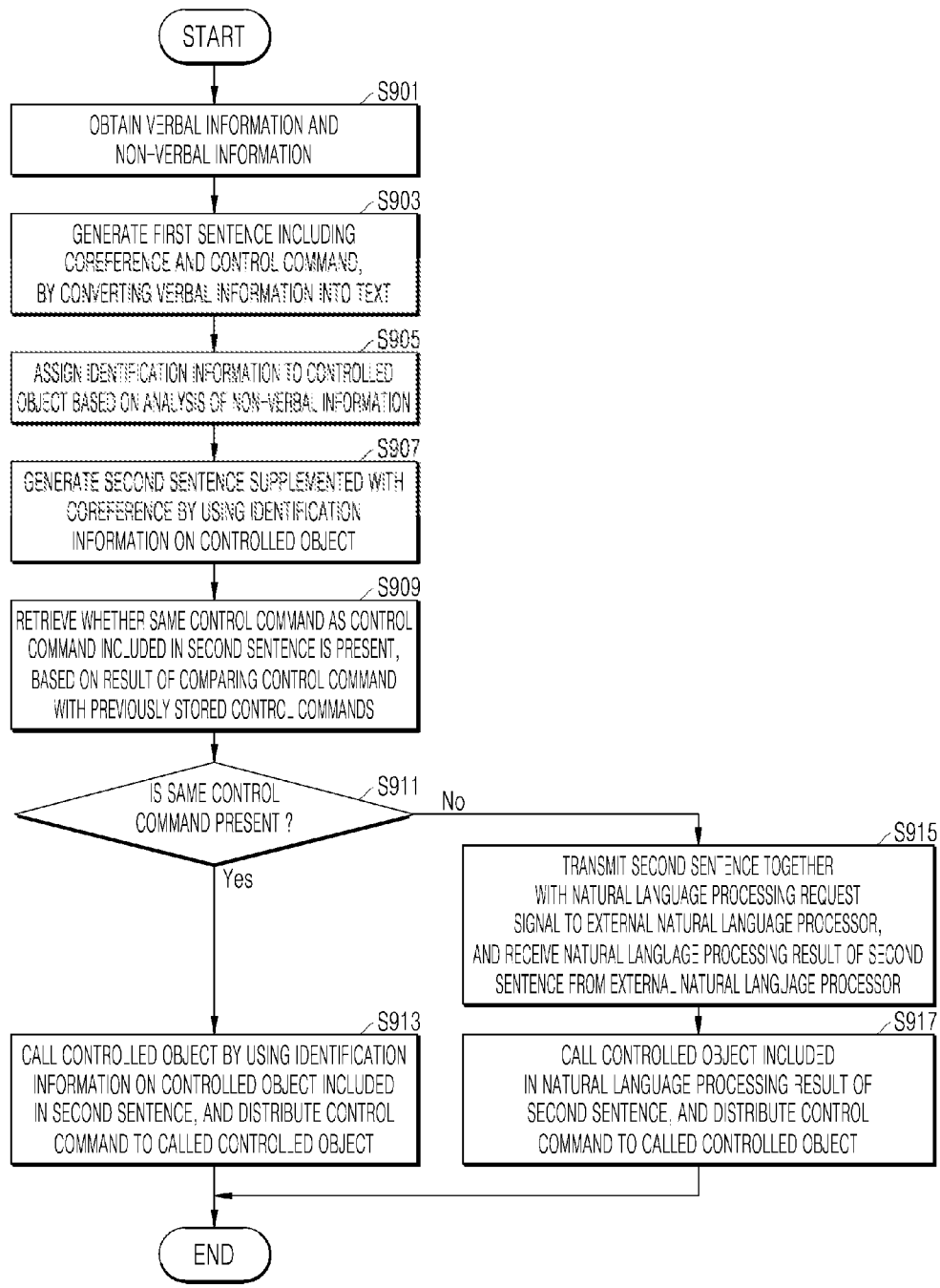
FIG. 9 is a flowchart illustrating an information processing method, according to another embodiment of the present disclosure.

FIG. 9 is a flowchart illustrating an information processing method, according to another embodiment. In the following description, description overlapping with those of FIGS. 1 to 8 will be omitted.

Referring to FIG. 9, at S901, the information processing apparatus 100 obtains the verbal information and the non-verbal information related to the controlling subject and the controlled object.

At S903, the information processing apparatus 100 generates the first sentence including the coreference and the control command, by converting the verbal information into text.

At S905, the information processing apparatus 100 assigns the identification information to the controlled object based on analysis of the non-verbal information.

At S907, the information processing apparatus 100 generates, from the first sentence, the second sentence supplemented with the coreference by using the identification information on the controlled object.

At S909, the information processing apparatus 100 retrieves whether the same control command as the control command included in the second sentence is present among the control commands previously stored in the memory, based on a result of comparing the control command with the control commands previously stored in the memory.

At S911, the information processing apparatus 100 determines whether the same control command as the control command included in the second sentence is present in the memory.

At S913, when the same control command as the control command included in the second sentence is present in the memory, the information processing apparatus 100 calls the controlled object by using the identification information on the controlled object included in the second sentence, and distributes the control command to the called controlled object.

At S915, when the same control command as the control command included in the second sentence is not present in the memory, the information processing apparatus 100 transmits the second sentence together with the natural language processing request signal to the server 300 (the external natural language processor), and receives the natural language processing result of the second sentence from the server 300.

At S917, the information processing apparatus 100 calls the controlled object included in the natural language processing result of the second sentence, and distributes the control command to the called controlled object.

Figure 10:
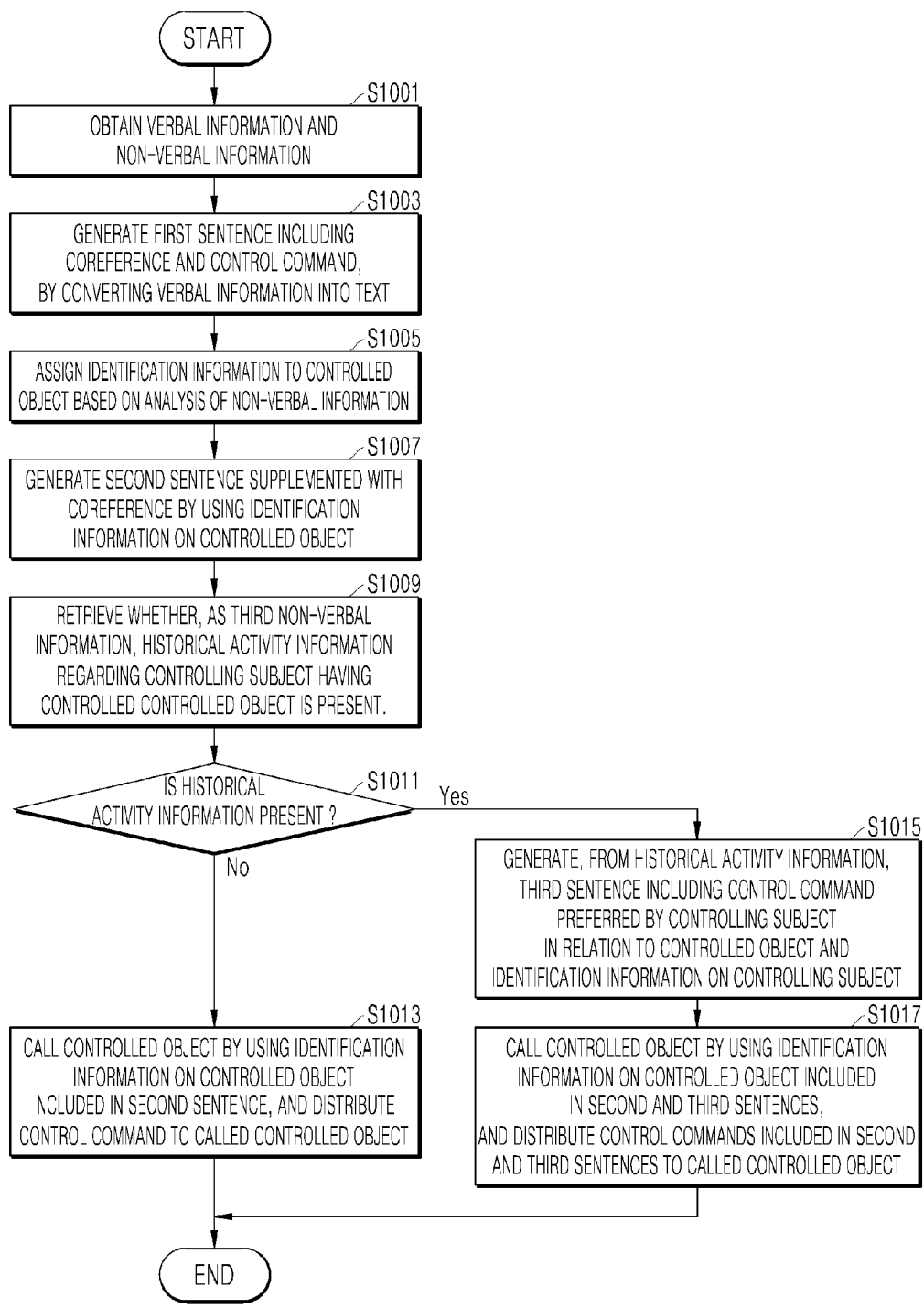
FIG. 10 is a flowchart illustrating an information processing method, according to still another embodiment of the present disclosure.

FIG. 10 is a flowchart illustrating an information processing method, according to still another embodiment. In the following description, description overlapping with those of FIGS. 1 to 9 will be omitted.

Referring to FIG. 10, at S1001, the information processing apparatus 100 obtains the verbal information and the non-verbal information related to the controlling subject and the controlled object.

At S1003, the information processing apparatus 100 generates the first sentence including the coreference and the control command, by converting the verbal information into text.

At S1005, the information processing apparatus 100 assigns the identification information to the controlled object based on analysis of the non-verbal information.

At S1007, the information processing apparatus 100 generates, from the first sentence, the second sentence supplemented with the coreference by using the identification information on the controlled object.

At S1009, the information processing apparatus 100 retrieves whether, as the third non-verbal information, historical activity information regarding the controlling subject having controlled the controlled object is present in the memory 170. Here, prior to the retrieving, the obtainer 161 may identify controlling subjects based on the feature points extracted using, as the first non-verbal information, the image information including the controlling subject, select, based on a result of comparing the feature points of the controlling subject with the previously stored feature points of users, a user having feature points corresponding to the feature points of the controlling subject, and assign the identification information on the selected user to the controlling subject.

At S1011, the information processing apparatus 100 determines whether, as the third non-verbal information, the historical activity information regarding the controlling subject having controlled the controlled object is present in the memory 170.

At S1013, when no historical activity information as the third non-verbal information is present in the memory 170, the information processing apparatus 100 calls the controlled object by using the identification information on the controlled object included in the second sentence, and distributes the control command to the called controlled object.

At S1015, when historical activity information as the third non-verbal information is present in the memory 170, the information processing apparatus 100 generates, from the historical activity information, the third sentence including the control command preferred by the controlling subject in relation to the controlled object and the identification information on the controlling subject.

At S1017, the information processing apparatus 100 calls the controlled object by using the identification information on the controlled object included in the second and third sentences, and distributes control commands included in the second and third sentences to the called controlled object.

Embodiments according to the present disclosure described above may be implemented in the form of computer programs that may be executed through various components on a computer, and such computer programs may be recorded on computer-readable medium. Examples of the computer-readable medium include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An information processing method, comprising:
obtaining verbal information and non-verbal information related to a controlling subject and a controlled object;
generating a first sentence including a coreference and a control command, by converting the verbal information into text;
assigning identification information to the controlled object based on analysis of the non-verbal information;
generating, from the first sentence, a second sentence supplemented with the coreference by using the identification information on the controlled object; and
calling the controlled object by using the identification information on the controlled object included in the second sentence, and distributing the control command to the called controlled object,
wherein generating the first sentence comprises converting the verbal information into text, and generating a first sentence including a missing sentence component based on analysis of the text,
wherein generating the second sentence comprises generating a second sentence supplemented with the missing sentence component by using a group of control commands in text form indicating possible functions of the controlled object in a current state of the controlled object as known from the identification information on the controlled object.

2. The method according to claim 1, wherein assigning the identification information to the controlled object comprises:
obtaining skeleton information on the controlling subject from the non-verbal information including image information on a gesture of the controlling subject;
specifying a direction indicated by the controlling subject, by using the skeleton information;
determining a controlled object in the direction indicated by the controlling subject; and
based on a result of comparing a feature point of the determined controlled object with previously stored feature points of objects, selecting an object having a feature point corresponding to the feature point of the determined controlled object, and assigning identification information on the selected object to the determined controlled object.

3. The method according to claim 1, wherein assigning the identification information to the controlled object comprises:
calculating distances from the controlling subject to each of controlled objects, by using, as the non-verbal information, image information including the controlled objects and the controlling subject;
determining a controlled object based on one of the calculated distances corresponding to the coreference; and
based on a result of comparing a feature point of the determined controlled object with previously stored feature points of objects, selecting an object having a feature point corresponding to the feature point of the determined controlled object, and assigning identification information on the selected object to the determined controlled object.

4. The method according to claim 1, wherein assigning the identification information to the controlled object comprises:
extracting a control command previously distributed by the controlling subject;
determining whether the previously distributed control command and the control command included in the first sentence are for the same controlled object; and
assigning the identification information on the controlled object included in the previously distributed control command as the identification information on the controlled object included in the first sentence, based on a result of determining that the two control commands are for the same controlled object.

5. The method according to claim 1, further comprising:
after generating the second sentence,
identifying the controlling subject based on a feature point extracted using, as the non-verbal information, image information including the controlling subject;
based on a result of comparing a feature point of the controlling subject with previously stored feature points of users, selecting a user having a feature point corresponding to the feature point of the controlling subject, and assigning identification information on the selected user to the controlling subject;
retrieving whether, as the non-verbal information, historical activity information regarding the controlling subject having controlled the controlled object is present; and
generating, based on the presence of the historical activity information, from the historical activity information, a third sentence including a control command preferred by the controlling subject in relation to the controlled object and the identification information on the controlling subject.

6. The method according to claim 5, wherein distributing the control command comprises calling the controlled object by using the identification information on the controlled object included in the second and third sentences, and distributing control commands included in the second and third sentences to the called controlled object.

7. An information processing method, comprising:
obtaining verbal information and non-verbal information related to a controlling subject and a controlled object;
generating a first sentence including a coreference and a control command, by converting the verbal information into text;
assigning identification information to the controlled object based on analysis of the non-verbal information;
generating, from the first sentence, a second sentence supplemented with the coreference by using the identification information on the controlled object; and
calling the controlled object by using the identification information on the controlled object included in the second sentence, and distributing the control command to the called controlled object,
wherein the method further comprises:
prior to distributing the control command,
retrieving whether the same control command as the control command included in the second sentence is present among previously stored control commands, based on a result of comparing the control command included in the second sentence with the previously stored control commands;
transmitting the second sentence together with a natural language processing request signal to an external natural language processor, based on the absence of the same control command as the control command included in the second sentence among the previously stored control commands; and
receiving a natural language processing result of the second sentence from the external natural language processor.

8. The method according to claim 7, further comprising:
prior to transmitting the second sentence together with the natural language processing request signal,
reconstructing the second sentence into a grammatical sentence.

9. An information processing apparatus, comprising:
an obtainer configured to obtain verbal information and non-verbal information related to a controlling subject and a controlled object;
a first generator configured to generate a first sentence including a coreference and a control command, by converting the verbal information into text;
an assigner configured to assign identification information to the controlled object based on analysis of the non-verbal information;
a second generator configured to generate, from the first sentence, a second sentence supplemented with the coreference by using the identification information on the controlled object; and
a distributor configured to call the controlled object by using the identification information on the controlled object included in the second sentence, and distribute the control command to the called controlled object,
wherein the first generator is configured to convert the verbal information into text, and generate the first sentence including a missing sentence component based on analysis of the text,
wherein the second generator is configured to generate a second sentence supplemented with the missing sentence component by using a group of control commands in text form indicating possible functions of the controlled object in a current state of the controlled object as known from the identification information on the controlled object.

10. The apparatus according to claim 9, wherein the assigner is configured to:
obtain skeleton information on the controlling subject from the non-verbal information including image information on a gesture of the controlling subject;
specify a direction indicated by the controlling subject, by using the skeleton information;
determine a controlled object in the direction indicated by the controlling subject; and
based on a result of comparing a feature point of the determined controlled object with previously stored feature points of objects, select an object having a feature point corresponding to the feature point of the determined controlled object, and assign identification information on the selected object to the determined controlled object.

11. The apparatus according to claim 9, wherein the assigner is configured to:
calculate distances from the controlling subject to each of controlled objects, by using, as the non-verbal information, image information including the controlled objects and the controlling subject;
determine a controlled object based on one of the calculated distances corresponding to the coreference; and based on a result of comparing a feature point of the determined controlled object with previously stored feature points of objects, select an object having a feature point corresponding to the feature point of the determined controlled object, and assign identification information on the selected object to the determined controlled object.

12. The apparatus according to claim 9, wherein the assigner is configured to:
    extract a control command previously distributed by the controlling subject;
    determine whether the previously distributed control command and the control command included in the first sentence are for the same controlled object; and
    assign the identification information on the controlled object included in the previously distributed control command as the identification information on the controlled object included in the first sentence, based on a result of determining that the two control commands are for the same controlled object.

13. The apparatus according to claim 9, further comprising:
    a retriever configured to retrieve whether the same control command as the control command included in the second sentence is present among previously stored control commands, based on a result of comparing the control command included in the second sentence with the previously stored control commands, prior to distributing the second sentence; and
    a transceiver configured to transmit the second sentence together with a natural language processing request signal to an external natural language processor, based on the absence of the same control command as the control command included in the second sentence among the previously stored control commands, and receive a natural language processing result of the second sentence from the external natural language processor.

14. The apparatus according to claim 13, further comprising a re-constructor configured to reconstruct the second sentence into a grammatical sentence, prior to transmitting the second sentence to the external natural language processor.

15. The apparatus according to claim 9, further comprising:
    an assigner configured to, after generating the second sentence, identify the controlling subject based on a feature point extracted using, as the non-verbal information, image information including the controlling subject, select a user having a feature point corresponding to a feature point of the controlling subject, based on a result of comparing the feature point of the controlling subject with previously stored feature points of users, and assign identification information on the selected user to the controlling subject;
    a retriever configured to retrieve whether, as the non-verbal information, historical activity information regarding the controlling subject having controlled the controlled object is present; and
    a third generator configured to generate, based on the presence of the historical activity information, from the historical activity information, a third sentence including a control command preferred by the controlling subject in relation to the controlled object and the identification information on the controlling subject.

16. The apparatus according to claim 15, wherein the distributor is configured to call the controlled object by using the identification information on the controlled object included in the second and third sentences, and distribute control commands included in the second and third sentences to the called controlled object.

* * * * *